UNITED STATES PATENT OFFICE.

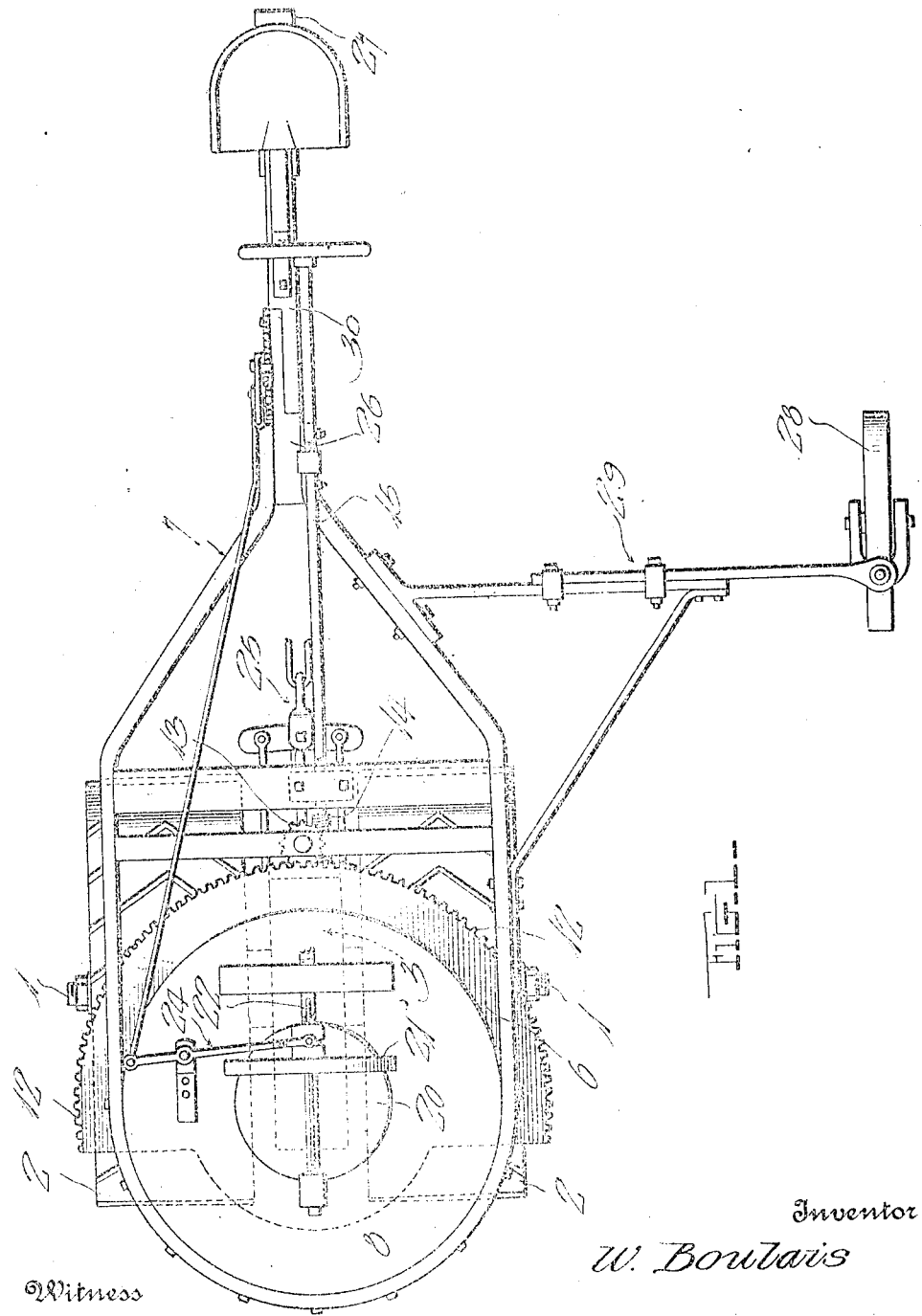

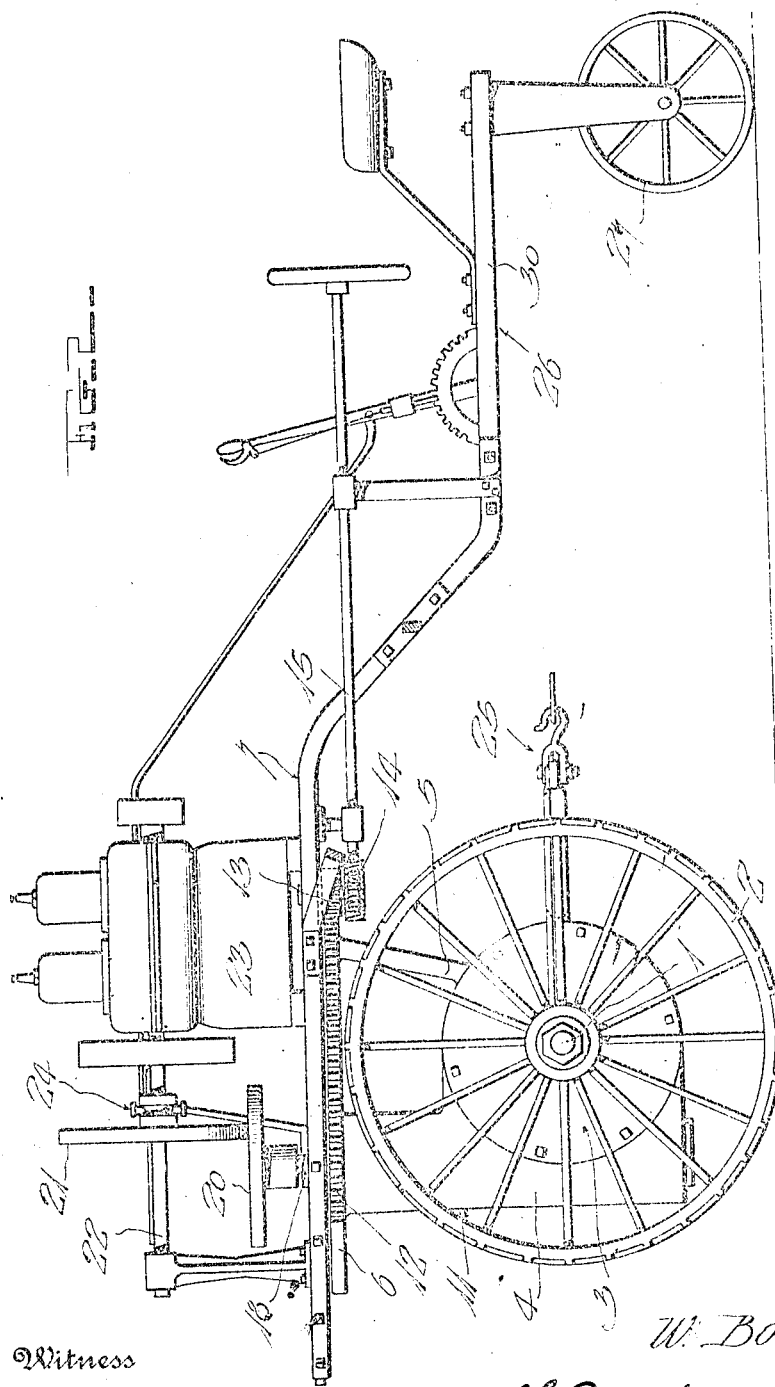

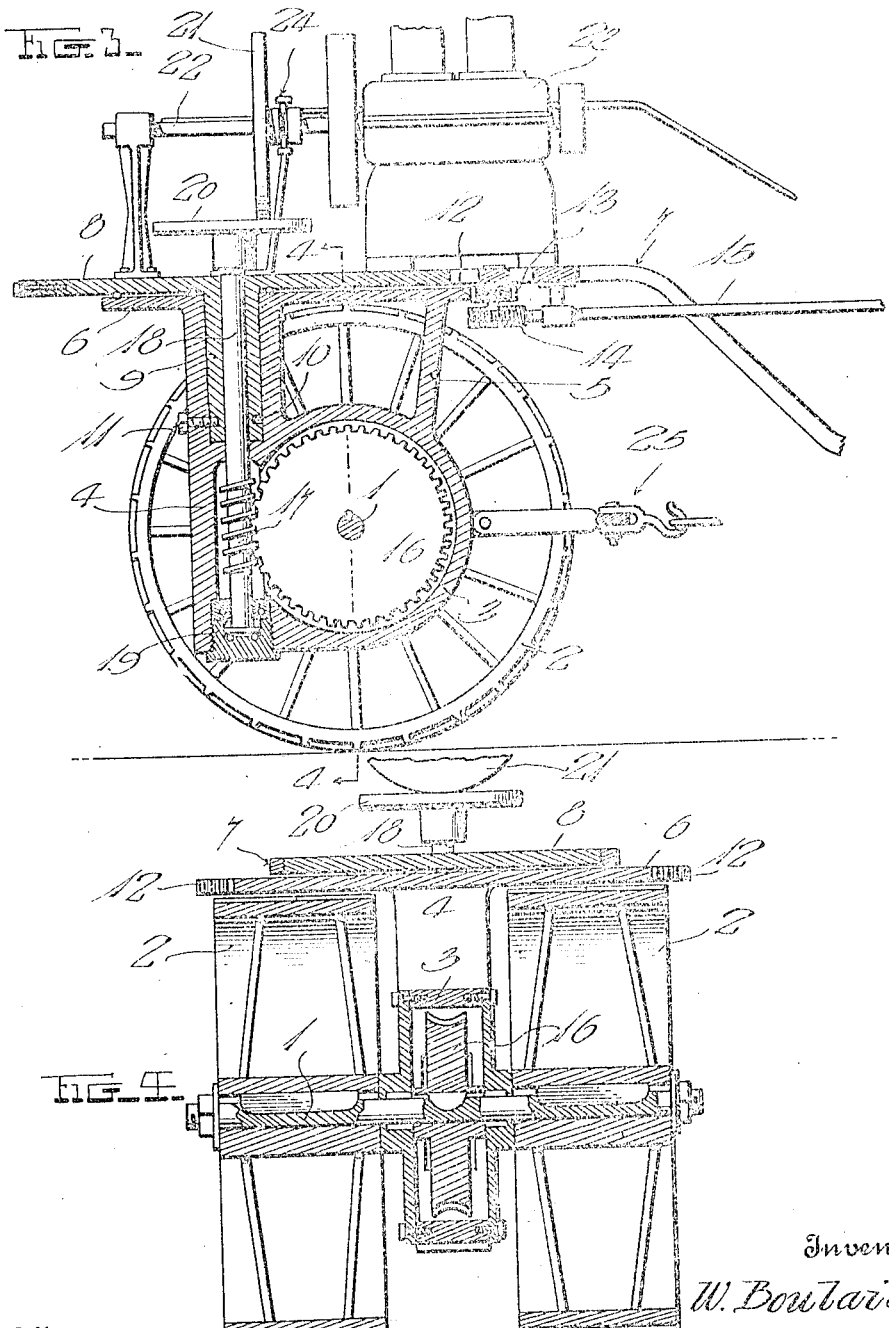

WILFRID BOULAIS, OF IPSWICH, MASSACHUSETTS.

TRACTOR.

1,291,740.  Specification of Letters Patent.  Patented Jan. 21, 1919.

Application filed April 26, 1918. Serial No. 230,892.

*To all whom it may concern:*

Be it known that I, WILFRID BOULAIS, a citizen of the United States, residing at Ipswich, in the county of Essex and State of Massachusetts, have invented certain new and useful Improvements in Tractors; and I do declare the following to be a full, clear, and exact description of the invention, such as will enable others skilled in the art to which it appertains to make and use the same.

My invention has for its principal object to provide an extremely simple and inexpensive, yet a highly efficient and durable traction and steering unit for the front ends of tractors, the tractor frame being supported by said unit and carrying means for operating the driving mechanism and means for steering.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a top plan view of a tractor embodying my invention;

Fig. 2 is a side elevation with parts removed and in section;

Fig. 3 is a longitudinal section through the front end of the machine; and

Fig. 4 is a vertical transverse section on the plane indicated by the line 4—4 of Fig. 3.

In the drawings above briefly described, the numeral 1 designates a front axle having one or more traction wheels 2 which are so secured in place as to permit removal of one or the other when two are employed, so that the machine may be driven without injuring rows of growing crops. Mounted on the axle 1 and carrying the bearings thereof, is a relatively flat gear case 3 having formed integrally with its front end a vertical cylindrical bearing 4. A vertical strut 5 preferably rises from and is integrally joined to the rear end of the casing 3, and the upper end of said strut and the bearing 4 are integrally or otherwise connected with a horizontal support 6 preferably in the form of a flat plate.

The tractor frame 7 is provided at its front end with a flat plate 8 from which a tubular journal 9 depends, said journal being preferably formed integrally with said plate and being rotatably received in the upper half of the bearing 4. To retain the journal and bearing in proper relation, the former is by preference formed with an annular groove 10 into which the inner end of a set screw or the like 11 extends, this arrangement serving in no manner to interfere with proper steering of the machine upon the journal 9 as a pivot. The rear edge of plate 6 is concentric with the journal 9 and bearing 4 and is formed with gear teeth 12, said teeth meshing with a pinion 13 mounted on the frame 7 and operated by any preferred means such as the worm of worm gear 14 on the front end of a longitudinal steering shaft 15.

Positioned within the gear case 3 and mounted for rotating the axle 1, is a worm gear 16 meshing with a worm 17 and a lower end of a vertical drive shaft 18 which is rotatably mounted in the tubular journal 9; suitable bearings such as 19 being also provided for said shaft wherever desirable. The upper end of shaft 18 is provided with a friction disk 20 coacting with a second disk 21 on an engine shaft 22, the engine 23 being mounted on the frame 7 in any preferred manner. By suitable means 24, the disk 21 may be shifted forwardly and rearwardly to vary the speed at which the shaft 18 is rotated and to reverse when necessary. When driving forwardly, the worm 17 tends to thrust upwardly on the shaft 18 and consequently the disk 20 is maintained in exceptionally tight engagement with the disk 21, so that no slippage whatever takes place. It is to be understood however that the engagement of the two disks is such as to prevent an undesirable amount of slippage when driving rearwardly also.

Any preferred hitch could well be employed, but I prefer to utilize an arrangement such as that indicated at 25, this hitch being connected to the traction and steering unit in any preferred manner so that the rearward pull of the load will tend to retain the wheels 2 in straight ahead position.

The features of construction above described may well be used on tractors of numerous types, but are designed primarily for a three point support machine as will be clear from Fig. 1. The tractor frame 7 is shown terminating at its rear end in a longitudinal beam 26 carrying at its rear end a supporting wheel 27. The wheel or wheels 2 form one point of support, the wheel 27 forms the second point, and the third is formed by a caster wheel 28 suitably mounted on a lateral extensible and retractable frame 29 secured to the frame 7. By extending or retracting the frame as required, and possibly removing one of the wheels 2, if two are provided, it is insured that no growing plants shall be injured while using the tractor in working the earth along the same.

In order to adapt the machine for more uses than would otherwise be possible, the beam 26 preferably includes a detachable rear section 30 carrying the wheel 27.

From the foregoing, taken in connection with the accompanying drawings, it will be obvious that although my invention is of extremely simple and inexpensive nature, it will be highly efficient and desirable, being of extremely strong construction without excessive weight. Since probably the best results are obtained from the details shown and described, they are preferably employed, but within the scope of the invention as claimed, numerous minor changes may well be made.

I claim:

In a front construction for tractors, a wheeled axle, a gear case mounted on said axle, a worm gear in said case for driving said axle, a vertical cylindrical bearing joined rigidly to and rising from the front end of said gear case, a strut rising rigidly from the rear end of said gear case, a horizontal supporting plate joined to the upper ends of said bearing and strut, a tractor frame having its front end supported on said plate, a vertical tubular journal depending rigidly from said frame and received rotatably in said bearing, a vertical driven shaft rotatably mounted in said tubular journal and having a worm meshing with said worm gear, means for driving said shaft, and means for steering.

In testimony whereof I have hereunto set my hand.

WILFRID BOULAIS.